(12) United States Patent
Mittell et al.

(10) Patent No.: US 11,061,669 B2
(45) Date of Patent: Jul. 13, 2021

(54) SOFTWARE DEVELOPMENT TOOL INTEGRATION AND MONITORING

(71) Applicant: ServiceNow, Inc., Santa Clara, CA (US)

(72) Inventors: Alexander David Mittell, Amherst, NH (US); Greydon Denis Buckley, Petaluma, CA (US); Christopher Joseph Corry, San Diego, CA (US); Colin Jayes O'Brien, Atlanta, GA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/682,387

(22) Filed: Nov. 13, 2019

(65) Prior Publication Data

US 2020/0293310 A1    Sep. 17, 2020

Related U.S. Application Data

(60) Provisional application No. 62/818,613, filed on Mar. 14, 2019.

(51) Int. Cl.
*G06F 8/76* (2018.01)
*G06F 8/71* (2018.01)

(52) U.S. Cl.
CPC . *G06F 8/76* (2013.01); *G06F 8/71* (2013.01)

(58) Field of Classification Search
CPC .................................... G06F 8/76; G06F 8/71
See application file for complete search history.

(56) References Cited

U.S. PATENT DOCUMENTS

| | | |
|---|---|---|
| 6,678,887 B1 | 1/2004 | Hallman |
| 7,350,209 B2 | 3/2008 | Shum |
| 7,890,802 B2 | 2/2011 | Gerber |
| 8,983,982 B2 | 3/2015 | Rangarajan |
| 9,104,995 B1 * | 8/2015 | Wang .................. G06Q 10/103 |
| 9,508,051 B2 | 11/2016 | Falk |
| 9,535,674 B2 | 1/2017 | Cooper |
| 9,557,969 B2 | 1/2017 | Sharma |
| 10,607,015 B1 * | 3/2020 | Hecht ....................... G06F 9/54 |

(Continued)

OTHER PUBLICATIONS

Shihab et al., "An Industry Study on the Risk of Software Changes", in SIGSOFT '12, Nov. 11-16, 2012, Cary, NC (Year: 2012).*

(Continued)

*Primary Examiner* — Doon Y Chow
*Assistant Examiner* — Timothy P Duncan
(74) *Attorney, Agent, or Firm* — Fletcher Yoder PC

(57) ABSTRACT

The present disclosure relates to improving the monitoring of software development activities by implementing a centralized software development tool that connects to one or more other development tools. In general, the centralized software development tool may receive activity data and/or historical data from the one or more software development tools that may be indicative of the occurrence of certain activities, such as commits, builds, stories, and like. In some embodiments, the centralized software development tool may provide event notifications based on the received data to facilitate and improve the efficiency of software development.

20 Claims, 15 Drawing Sheets

(56) References Cited

U.S. PATENT DOCUMENTS

| | | | |
|---|---|---|---|
| 2011/0067005 A1* | 3/2011 | Bassin | G06F 11/008 |
| | | | 717/127 |
| 2011/0314450 A1* | 12/2011 | Shochat | G06Q 10/06 |
| | | | 717/124 |
| 2013/0083031 A1* | 4/2013 | Lehnherr | G06Q 10/06 |
| | | | 345/440 |
| 2014/0033176 A1* | 1/2014 | Rama | G06F 11/008 |
| | | | 717/124 |
| 2014/0165044 A1* | 6/2014 | McCormick | G06Q 10/103 |
| | | | 717/124 |
| 2018/0275970 A1* | 9/2018 | Woulfe | G06N 3/0445 |
| 2018/0276584 A1* | 9/2018 | Woulfe | G06Q 10/06398 |
| 2019/0102228 A1 | 4/2019 | Fuller et al. | |
| 2019/0180039 A1* | 6/2019 | Considine | G06F 21/604 |
| 2019/0294536 A1* | 9/2019 | Avisror | G06F 11/3688 |
| 2020/0159912 A1* | 5/2020 | Cervantez | G06F 21/53 |

OTHER PUBLICATIONS

Eyolfson et al., "Do Time of Day and Developer Experience Affect Commit Bugginess", in Proceedings of the 8th Working Conference on Mining Software Repositories, May 2011, pp. 153-162 (Year: 2011).*

U.S. Appl. No. 16/357,782, filed Mar. 19, 2019, Anna Kotliarevskaia.

* cited by examiner

SOFTWARE DEVELOPMENT TOOL INTEGRATION AND MONITORING

CROSS REFERENCE TO RELATED APPLICATIONS

This application claims priority from and the benefit of U.S. Provisional Application No. 62/818,613, entitled "SOFTWARE DEVELOPMENT TOOL INTEGRATION AND MONITORING," filed Mar. 14, 2019, which is incorporated by reference herein in its entirety for all purposes.

BACKGROUND

The present disclosure relates generally to software development. More specifically, the present disclosure relates to managing and/or modifying software development activities using activity data and/or historical data received from software development tools.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Additionally, certain cloud-computing platforms enable software development. For example, a cloud-computing platform may host multiple software development tools that enable a user to plan, build, and modify a software file during the different stages of the software development lifecycle. Such development tools, however, often are limited by various limitations in their design and/or use.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Monitoring a software file during development, e.g., while the software file is modified and moves to a different software development tool, to proactively detect errors in the modified software file is a memory-intensive process as the data produced by each software development tool in response to modifying the software file may be in different formats. With this in mind, the present approach generally relates to a centralized software development tool system that improves the efficiency of the software development process by integrating with multiple software development tools and identifying potential risks that occur during the software development cycle based on activity data and/or historical data obtained from the multiple software development tools. The activity data and the historical data may include metadata indicative of the occurrence of certain software development activities (e.g., number of commits, an identity of a user executing an action on the software file, a time range when the action occurred, a revert, a build, a merge, and the like), rather than the content of the software development activities (e.g., what specific lines of code in a software file different as a result of a commit, revert, merge, and the like). In some embodiments, the centralized software development tool will track actions and consequences for a software file across multiple software development tools, as discussed in more detail herein. In some embodiments, the centralized software development tool may transmit an alert or an indication to a user when an identified risk is above or below a threshold. In some embodiments, the centralized software development tool system may take certain actions on the software development tools, such as to selectively enable and/or prevent the software file proceeding to a different stage of the software development tool. In some embodiments, the centralized software development tool may flag the software file to indicate to a user that the flagged software file should receive maintenance.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 9 shows an example of a software development tool connection form, in accordance with aspects of the present disclosure;

FIG. 10 shows a second example of a software development tool connection form, in accordance with aspects of the present disclosure;

FIG. 11 shows an example of a software development tool connection form with a date range window, in accordance with aspects of the present disclosure;

FIG. 12 shows a third example of a software development tool connection form, in accordance with aspects of the present disclosure;

FIG. 13 shows an example of a software development tool risk window, in accordance with aspects of the present disclosure;

DETAILED DESCRIPTION

Figure 1:
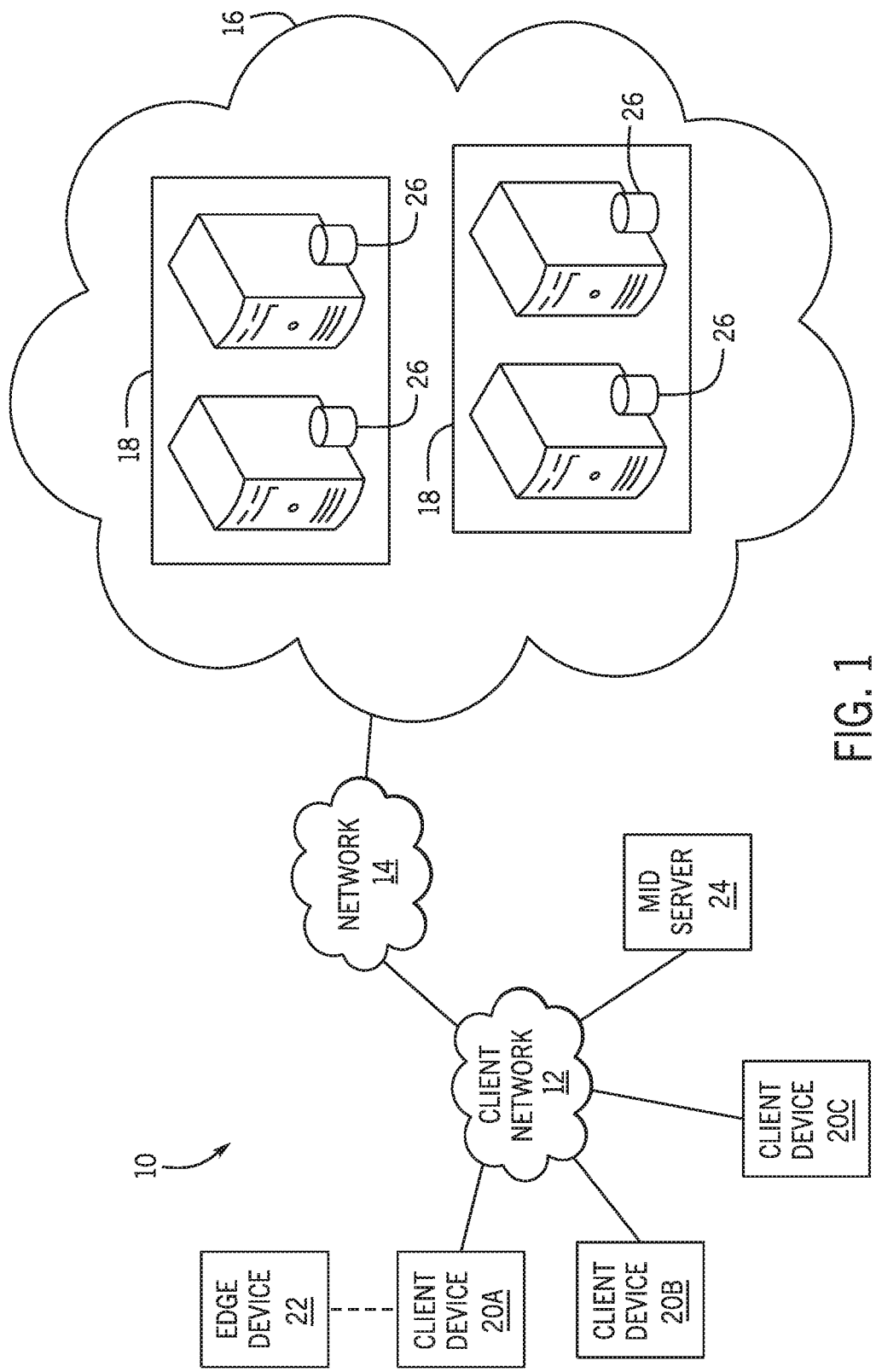
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As discussed above, an enterprise may use multiple software development tools to manage different stages in the software development lifecycle (e.g., planning, building, testing, and the like) for a software file. Monitoring the software file through each stage of the software development lifecycle is a complex process as each software development tool generates data in a format specific to the respective software development tool. Existing software development tools may be able to connect to (e.g., establish communication or integrate with) other software development tools, thereby permitting monitoring of one or more additional stages in the lifecycle of software development. However, the data produced by the software development tools may be memory-intensive as the data may contain specific details regarding what was changed in the software file by the software development tool and/or at various stages of the software development lifecycle. As such, analyzing the data produced by the software development tools becomes increasingly tedious, time-consuming, expensive, and inefficient.

The present approach is directed to a centralized software development system that is capable of connecting to multiple software development tools and modifying software development activities based on activity data and/or historical data obtained from the multiple software development tools using a centralized software development tool to improve the efficiency of the software development process. More specifically, the disclosed centralized software development tool receives activity data and/or historical data, which are indicative of the occurrence of software development activities (e.g., metadata) such as changes, commits, runs, builds, test statuses, artifacts, and the like, rather than data that includes the specific content of the software development operations. The disclosed centralized software development tool determines whether the activity data and/or historical data is indicative of a risk that a software file will encounter an error and provides a notification of the risk to a user (e.g., via a user device such as a computer, tablet, mobile phone, and the like) and/or takes a preventative action (e.g., stopping a software file from moving to a different stage of the software development lifecycle and/or flagging the software). For example, the centralized software development tool may enable users to automate an approval process for certain changes made to a software file based at least on the activity data and/or historical data that have been obtained during the different stages of software development (e.g., along the development pipeline). In some embodiments, the centralized software development tool may obtain historical data by obtaining (e.g., importing, accessing, or retrieving) the historical data from each of the multiple software development tools, and identify trends associated with the historical data as discussed in more detail herein. In this manner, the centralized software development tool may provide insights about the operation of the software development process that may be difficult to see and, as such, enable users to identify and address problems in their software as well as measure progress.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
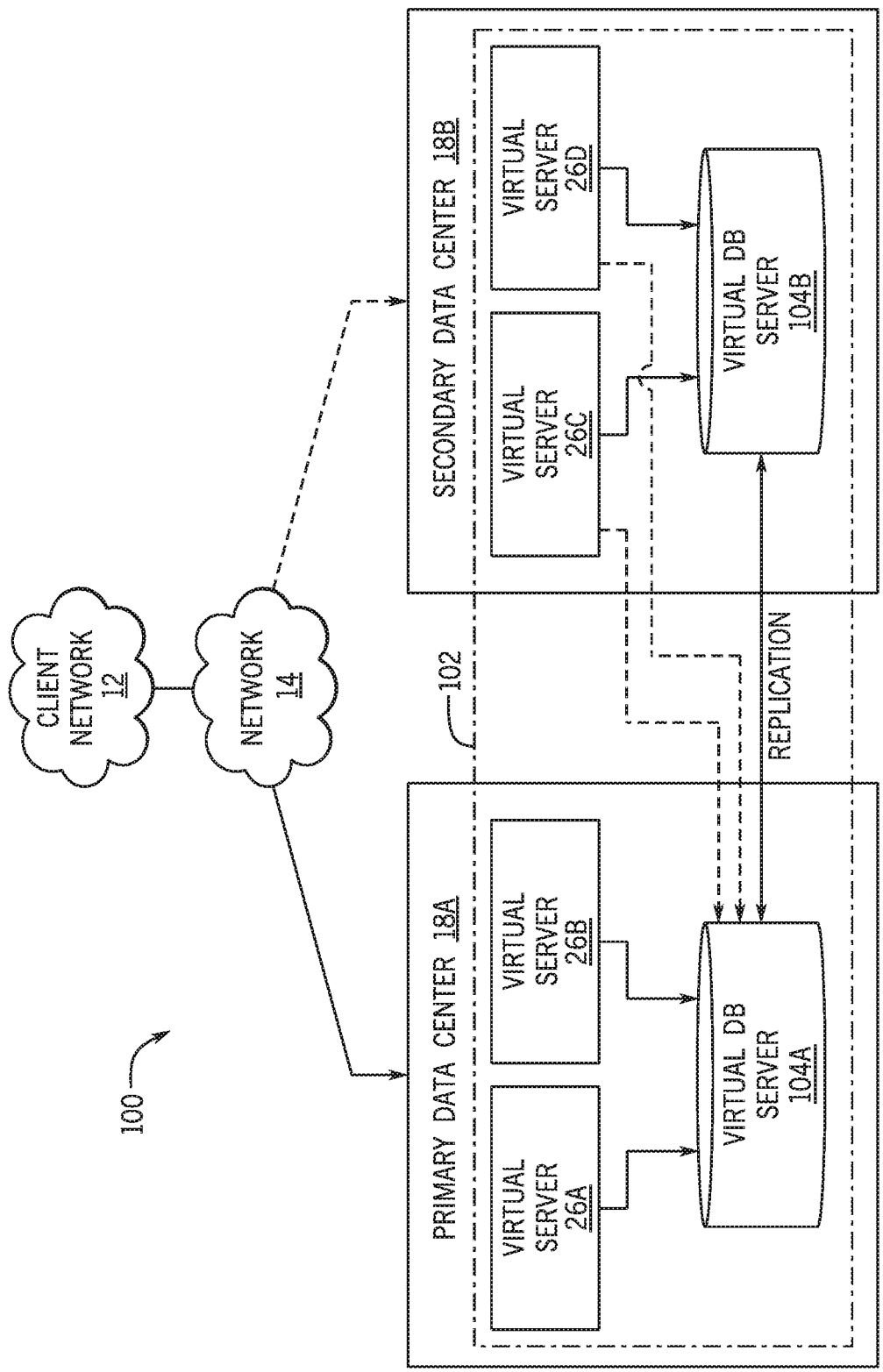
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
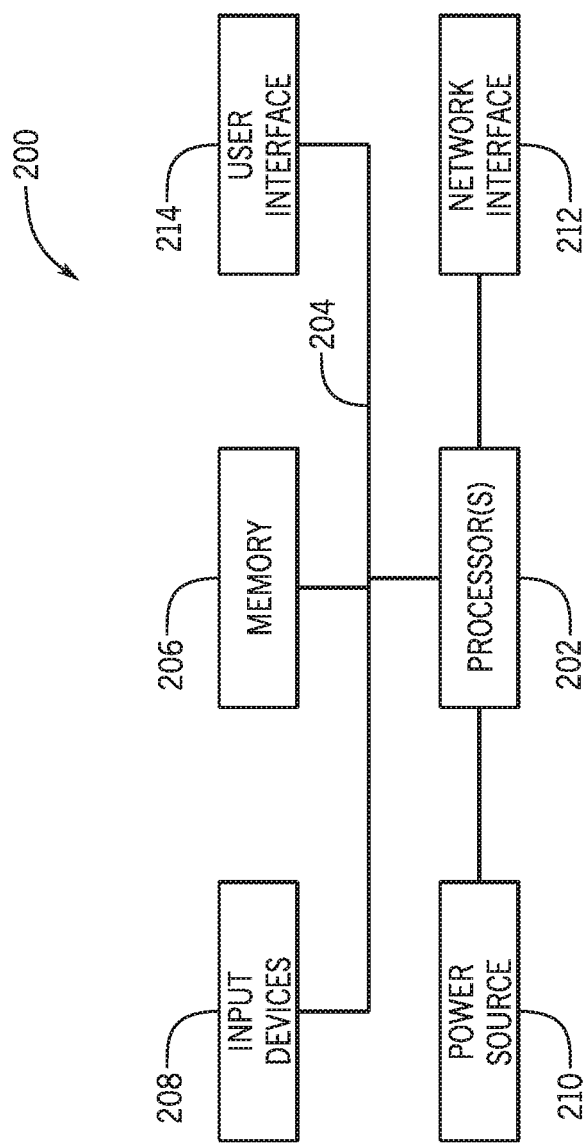
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
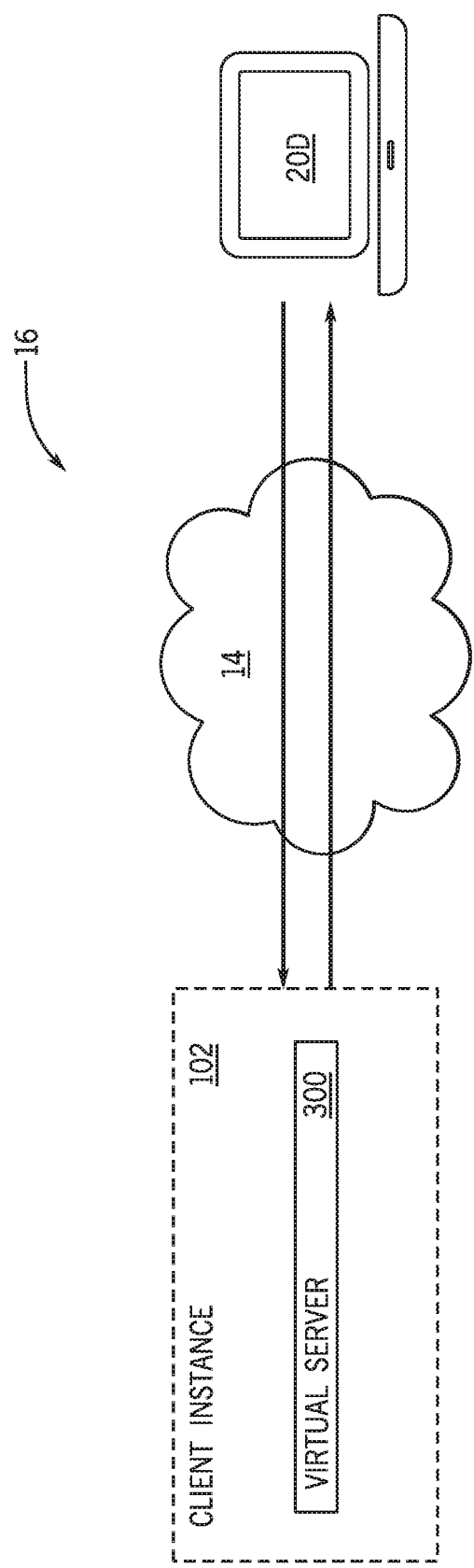
FIG. 4 is a block diagram illustrating an embodiment in which a virtual server supports and enables the client instance, in accordance with aspects of the present disclosure.

FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
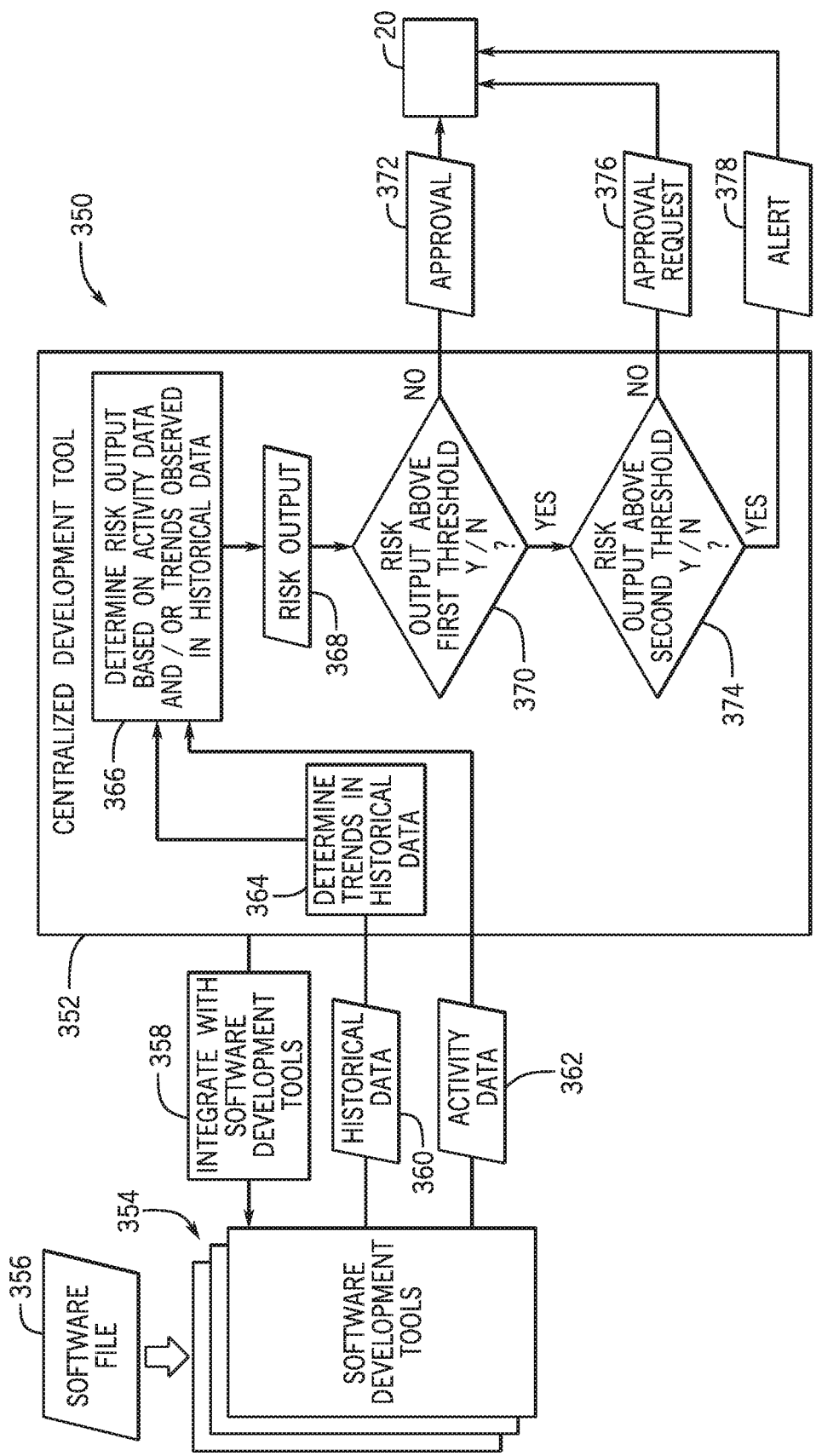
FIG. 5 shows a flow diagram of an example process for a centralized software development tool connecting to one or more process development tools, in accordance with aspects of the present disclosure.

With the preceding in mind, FIG. 5 is a flow diagram 350 that shows how a centralized software development tool 352 may communicate and manage software development tools 354, such as may be implemented on a cloud computing platform as described herein, as a software file 356 is modified by the development tools 354. It should be noted that at least some of these steps may be executed by a processor, such as processor 82, a processor of a client device, or any suitable processor. Furthermore, the steps illustrated in the flow diagram 350 are meant to facilitate discussion and are not intended to limit the scope of this disclosure, since additional steps may be performed, certain steps may be omitted, and the illustrated steps may be performed in any order.

At block 358, the flow diagram 350 begins with the centralized software development tool 352 connecting to (e.g., establishing communication with, executing a connect and configuration setup, and the like) with the one or more software development tools 354. In some embodiments, the connection step (e.g., process block 358) may involve verifying connectivity to one or more software development tools 354 using credentials provided as input (e.g., from a user) or accessed from a database and providing feedback of any issues, such as a failure to connect. In some embodiments, the centralized software development tool 352 may utilize a connection feature (e.g., platform connection alias) to facilitate credentials and connection details. The credentials and connection details may be retrieved from the connection feature in response to a request submitted by a user. In some embodiments, the centralized software development tool 352 may support remote (e.g., API-driven) creation of notification webhooks that may be configured during connection (e.g., block 358). For example, the centralized software developmental tool 352 may communicate via a suitable API driven-method, such as a Skyhook. In implementations where a centralized software development tool 352 provides a way to test a webhook, the test may also be performed during block 358. In implementations where a centralized software development tool 352 does not support remote management of webhooks, the steps for providing the setup may be provided manually via user interaction with a suitable input device.

In some embodiments, the centralized software development tool 352 may connect to the one or more software development tools 354 in response to a request submitted by a user (e.g., software developer, manager, and the like). For example, the request may be a discovery query executed via the centralized software development tool 352 to search for the one or more software development tools 354 that are present on the network 14. In some embodiments, the software development tool 352 may be configured to automatically query the network 14 to look for any of the one or more software development tools 354 that are active (e.g., currently being used or user within a time frame) and are not already connected to the centralized software development tool 352. In any case, once the one or more software development tools 354 have been discovered, the centralized software development tool 352 may connect to the one or more software development tools 354 so that the centralized software development tool 352 may receive activity data and/or historical data, as discussed in more detail below.

After the centralized software development tool 352 is connected to the one or more software development tools 354 (process block 358), the centralized software development tool 352 receives historical data 360 and/or activity data 362 from the software development tools 354. In general, the historical data 360 and/or activity data 362 are data indicative of the occurrence software development activities related to a software development tool 354, such as stories, commits, builds, merges, and the like, rather than the content of the software development operations. For example, the activity data 362 associated with a commit may include a location within the software file 356 (e.g., a range of lines of code) where a user made a change, a magnitude of change (e.g., a number of characters and a number of lines), an identity of a user that made the commit, whether the commit was reverted, and the like, rather than the specifics of what was changed in the software file 356 (e.g., at least a portion of the previous version of the software file). As may be appreciated, the historical data 360 and/or activity data 362 is less memory-intensive than the data that includes the specifics of what was changed in the software file 356 as a result of a software development activity.

While the historical data 360 includes generally similar information as the activity data 362, such as being indicative of a number of commits in the software file 356, identity of a user who made the commits, time since last merge or build, and the like, the historical data 360 may also include any outcomes that may be correlated to data. For example, the historical data 360 may indicate a number of commits that were executed as well as indicating that an error in the software file 356 occurred after the commits were executed. In this way, the historical data 360 may be used to correlate activity data 362 with potential outcomes (e.g., failures and success) and, thus, ensure that obtained activity data 362 are viewed with an appropriate context. As such, the centralized software development tool 352 may receive the historical data 360 before receiving the activity data 362 such that the centralized software development tool 352 may determine the correlations between outcomes and software development activities before using the activity data 362 to make determinations of whether a modified software file 356 is at risk for an error.

In some embodiments, the historical data 360 may be retrieved by actively querying for a range of data. For example, the centralized software development tool 352 may execute a tool URL to get target records. Additionally, a user, such as development operations (DevOps) administrators, may choose how much historical data 360 to import by specifying a date range.

The centralized software development tool 352 may retrieve activity data 362 and/or historical data 360 from the software development tool 354 in different ways, such in response to connection between the centralized software development tool 352 and the software development tool 354 or in response to a user-submitted query. For example, when the centralized software development tool 352 is connected to the software development tool 354, the centralized software development tool 352 may obtain activity data 362 and/or historical data 360 from data sources associated or within the development tool via a user input. The activity data 362 and/or the historical data 360 may include stories, commits, and job runs. In some embodiments, importing the activity data 362 and/or the historical data 360 may be a one-time setup activity for each tool, such as once configuration is setup. After the initial import of the activity data 362 and/or the historical data 360, any new activity may trigger an event notification that signifies the new activity, at which point a user may decide whether or not to import additional new activity data 362 and/or new historical data 360.

As another non-limiting example, the centralized software development tool 352 may retrieve activity data 362 and/or historical data 360 by actively querying for a range of data, receiving event notifications from the tool about events (e.g., software development activities) that are being tracked, or both. As used herein, an "event notification" is a notification including activity data 362 sent by a software development tool 354 to the centralized software development tool 352. It should be noted that event notifications may enable users to more quickly detect issues in software files 356 as the activity data 362 is relatively less-memory intensive than the specific content associated with the activity data 362, as discussed in more detail with regard to FIG. 7.

In some embodiments, the centralized software development tool 352 may be configured to provide a user interface to a user (e.g., via a display) with one or more selectable features that enable a user to control the actions performed by the centralized software development tool 352. For example, the interface may include an "import" button, or selectable feature, and the user clicking or selecting the "import" button may cause the centralized software development 352 to obtain activity data 362 and/or historical data 360 from one or more software development tools 354. In some embodiments, the obtained activity data 362 and/or historical data 360 may be saved as a record to be inserted in an "Import Requests" table, where the record may remain until a background job picks it up for processing. When processing starts, the record may be broken into pages to minimize the amount of data being processed at any one time. To retrieve at least one page, a script may initiate a "REST V2" call to the target software development tool 354 with parameters that limit the returned activity data 362 and/or historical data 360 to the current page size and cursor position. In some embodiments, each page is a JSON object that may be processed in memory, but it should be noted that the footprint and processing time is kept small by the page settings (<10 MB). The activity data 362 and/or the historical data 360 may be transformed and inserted into an appropriate table directly. After the first page is processed, a request for the next page may be stored and the process may repeat until a number of page requests (e.g., above a threshold) have been processed. In some embodiments, a single page request may be active at a time. For example, a processor may first checks if an existing page request is in flight, and if so, it may take no action until the next check.

In some instances, the request to import the activity data 362 and/or historical data 360 may fail. If the request fails, the centralized software development tool 352 may attempt to import the activity data 362 and/or the historical data 360 a predetermined number of times until, for example, a retry limit (e.g., as defined by a user) is reached, after which it permanently fails. Upon failing, the entire import request may be marked as failed and processing ends with the current page. An administrator may restart a failed request through a UI action, at which point processing may start at the failed page and carry on normally. Error details for failed requests are attached as details on the request record.

In some embodiments, the request process runs under a dedicated system account "devops.system". The dedicated system account may have write access to administration (e.g., DevOps) tables, but it has no login rights. Credentials for external tools may be stored as Connection Aliases—the same provided in the connection step (process block 358) and, in some embodiments, used for event notification processing.

In some embodiments, a page size, a delay between page requests, a request timeout, and a retry limit may be configurable system properties that apply to at least one import request. In addition, there may be tool-specific filters that may be specified when the request is made. For example, during GitHub imports a request may be limited to certain branches within a repository or commits within a date range. Filters may not persist, so they may be specified any time the request is submitted. Although this may be implemented as a one-time process, administrators may choose to use these filters to break the import into subsets.

Regardless of whether the centralized software development tool 352 receives activity data 362 and/or historical data 360, the centralized software development tool 352 may transform (e.g., convert) the obtained activity data 362 and/or historical data 360 to a neutral format (e.g., non-specific to a particular type of software development tool). It should be noted that transforming the activity data 362 and/or historical data 360 into a neutral format may enable the transformed data to be stored more efficiently in one or more tables. For example, the activity data and/or historical data 360 received from multiple software development tools 354 may be stored based on tool-type, which may improve the organization and reduce the foot-print of the data, such as by reducing the number of tables needed to store the activity data and/or historical data. Further, obtaining the activity data 362 and/or historical data 360 may involve using a query to create records from the transformed data. The received event notifications may include a source, time, and payload (body of the request) of every request that may be stored for subsequent analysis.

In some embodiments, the centralized software development tool 352 may tag the obtained activity data 362 and/or historical data 360 with a tool identifier tag that identifies the particular type of software development tool 354 associated with the obtained activity data 362 and/or historical data 360. In this way, the centralized software development tool 352 may be configured to correlate software development activities executed by multiple software development tools 354 on the software file 356, while maintaining more specific, contextual information (e.g., via the tool identifier tag) that enables a user (e.g., software developer) to obtain more granular information (e.g., the content of the software development operations) if necessary.

Figure 6:
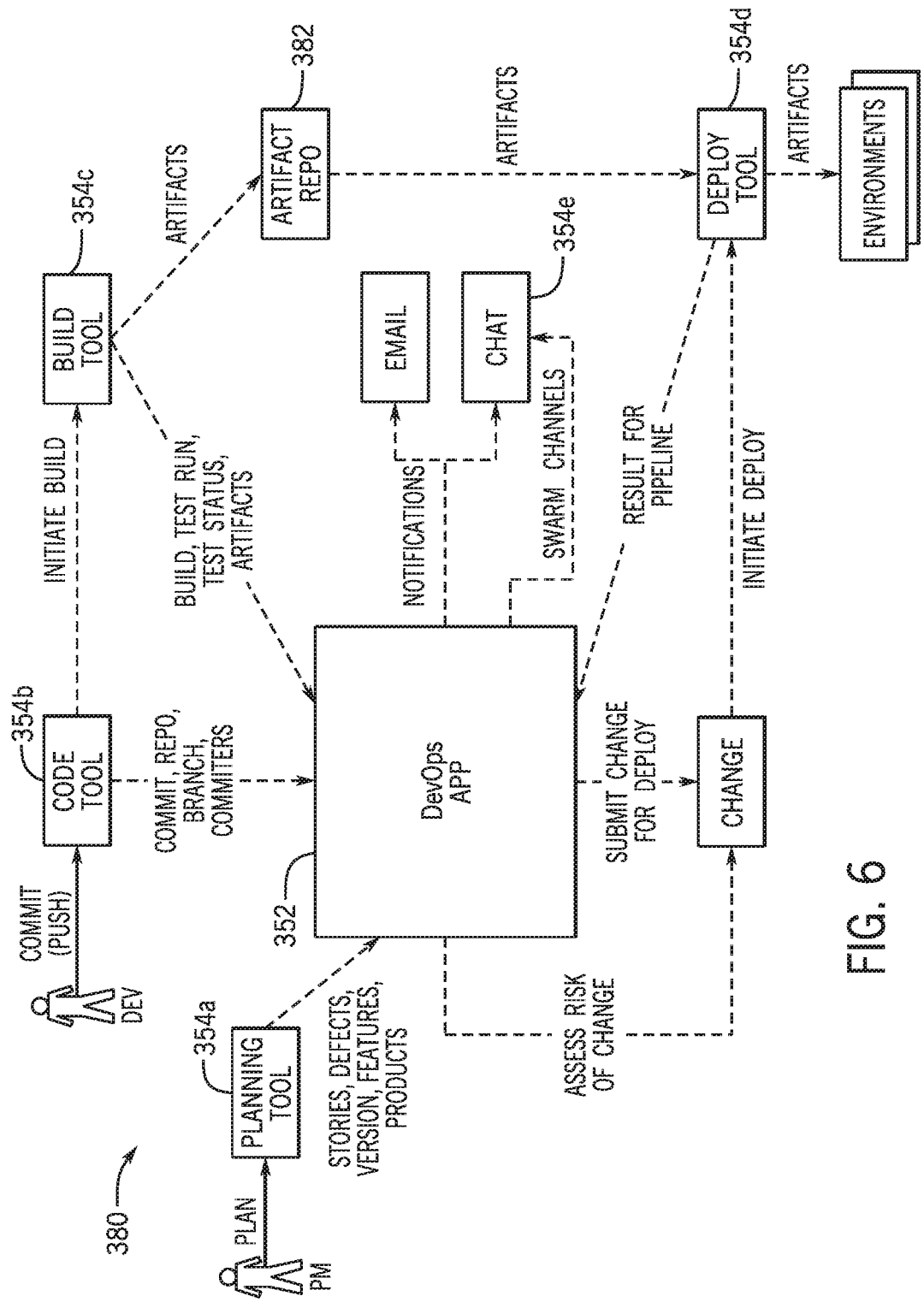
FIG. 6 shows a schematic diagram of multiple software development tools in communication with a centralized software development tool, in accordance with aspects of the present disclosure.

In some embodiments, the activity data 362 may be obtained via received event notifications that may be indicative of software development activities occurring on the software development tools 354 within a software development pipelines. As discussed in more detail regarding FIG. 6, the event notifications may be indicative of builds, commits, stories, defects, and the like. In some embodiments, a single scripted REST endpoint may handle event notifications from all tools. Security on the inbound connection may take any form that is supported by the instance. In some embodiments, a configuration for an administrative (e.g., DevOps) instance is to have a dedicated integration user, and that user's credentials are applied as basic authentication to an inbound request. For example, a GitHub webhook may have the form: 'https://devops.integration.user:devops.integration.password@devops.service-now.com/api/sn_devops/event'.

In some embodiments, event notifications may not be handled immediately. Instead, a request payload may be validated and diverted to a staging table for later processing, referred to herein as a payload processing, which is discussed in more detail with respect to FIG. 7. In some embodiments, data from a payload table may be used for troubleshooting.

In some embodiments, event notifications may be missed or "orphaned." Recovery of such messages may depend on the software development tool 354 and the type of event notification. In some embodiments, if an initial creation of a particularly record (e.g., release, story, commit, etc.) is missed, an event notification related to the missed record may be identified when the source record is updated and registers the record as a new item. For example, if a first story refers to a version that has not been recorded, a new record may be created for this newly-discovered version, referred to as "on-the-fly." It should be noted that "on-the-fly" discovery may not always be performed, so some records may be accumulated that cannot be connected to existing data, referred to as orphaned records. The orphaned records may be marked accordingly and held for processing by a scheduled job that may attempt to reconcile the connections in one or more subsequent passes. In some embodiments, orphaned records may be sent to development operations administrators for inspection and remediation.

When the centralized software development tool 352 receives historical data 360, the centralized software development tool 352 may determine (process block 364) trends in the historical data 360. As discussed above, the historical data 360 may generally indicate certain software development activities performed by a software development tool 354 as well as outcomes (e.g., a success or error) that occurred at the same or different software development tool 354. In some embodiments, the centralized software development tool 352 may determine that certain software development activities are more likely to result in an error than others. For example, the centralized software development tool 352 may determine that when the software file 356 is changed after a time range (e.g., a week, a month, a year, etc.), the software file 356 more than likely has an error. As such, the centralized software development tool 352 may assign a risk weight to changes in software files 356 made after a certain time range. It should be noted that, at least in some instances, the risk weight may be assigned by a user, such as an administrator or manager.

In block 366, the centralized software development tool 352 may determine a risk output 368 based on the activity data 362 and/or the trends observed in the historical data 360 (e.g., from block 364). For example, the centralized software development tool 352 may determine a numerical value (e.g., between 1 and 100) indicating a likelihood that the actions represented by the activity data 362 may result in an error in the software file 356. In general, the risk output 366 may be calculated based on a weighted sum of different risk weights associated with the software development activities indicated by the activity data 362. A non-limiting example of a risk output 368 calculation is presented below:

how often does the deploy job fail (job score)
how often does a deploy of the package fail (package score)
how often does a deploy to the environment fail (environment score)
how risky is the code (code score)
how much risk can be tolerated by the stage (stage.risk factor)
(((env score*risk.env.weight)+(job score*risk.job.weight)+(code score*risk.code.weight)+(package score*risk.package.weight))/4)*stage.risk factor Code Score
When a job run occurs, the repo and committer score algorithms are run and the results averaged together to get the build score for that run. At the end of the run, if a package is built, then the build score is used to update the code score on the package record. This will be an average of all the committer and repo scores over all the builds of that package.

Score Definitions
Environment=deploy success/total deploys;
Package=test run successes/total tests run;
Job=job success/total;
Repository=see algo
Committer=see algo Score Calculation
CalculateScore(new_score, current_score){var score=current_score;
score-=current_score/risk.scope;
score+=new_score/risk.scope;
return score;

In block 370, the centralized software development tool 352 determines whether the risk output 366 is above an error threshold probability. For example, the risk output 368 may be indicative of an error when the risk output 368 is above a threshold (e.g., greater than 70, 80, or 90 on a scale from 1 to 100) or within a threshold range. When the risk output 368 is below the threshold, the centralized software development tool 352 may output an approval 372 to a user via a client device 20 that indicates that there are likely no errors associated with the software file at this time. Alternatively, no approval 370 may be sent to the user via the client device 20 when the centralized software development tool 352 determines that there is no error associated with the software file 356.

When the centralized software development tool 352 determines that the risk output 368 is indicative of an error, the centralized software development tool 352 may determine whether the risk output 368 is above a second error threshold, at block 374. When, the risk output 368 is not above the second threshold, the centralized software development tool 352 may output an approval request 376 to a user via a client device. The approval request 376 may generally indicate the numerical value of the risk output 368 and, thus, indicate that an error in the software file 356 is possible or likely. Additionally, the approval request may enable the user to make the decision of whether to approve, reject, or alert other users (e.g., via respective client devices) of the possible error. Alternatively, when the centralized software development tool 352 determines that the risk output 368 is above a second threshold, the centralized software development 352 may automatically send an alert 378, such as an event notification or a control signal to one or more client devices 20 to stop operating or modifying the software file 356 as the software file 356 has an error that may result in wasted processing time.

To illustrate the process described above, FIG. 6 illustrates a software development system 400 having the centralized software development tool 352 that is connected to multiple software development tools 354. In general, each of the software development tools 354 may be utilized by a user to accomplish certain tasks during stages in the software development process. As shown in the illustrated embodiment of the software development system 400 of FIG. 6, the process development tools 354 include a planning tool 354a, a code tool 354b, a build tool 354c, a deploy tool 354d, and a chat tool 354e.

The planning tool 354a, for example, may be utilized by a product owner and/or release manager to create projects, features, releases, stories, and defects. The code tool 354b, for example, may be utilized by software developers to commit code and configuration to a code tool. The build tool 354c, for example, may be utilized to pull and build committed code and transmit artifacts to an artifact repository 382. The deploy tool 354d may receive artifacts from the artifact repository 382 and transmit the artifacts to environments to undergo testing and potentially promotion to a subsequent environment. The chat tool 354e may be used to display notifications to a user, such as alerts, approvals, and/or approval requests. For example, the chat tool 354e may be a third-party text-based communication application.

As discussed herein, the centralized software development tool 352 may identify errors in a software file 356 based on the activity data 362 and/or determined trends in the historical data 360 rather than specific instances of a build or deployment. As the data related to trends may be aggregated, the centralized software development tool 352 may import certain metadata associated with a process rather than the details of the process itself. As a non-limiting example, the centralized software development tool 352 may identify that a commit occurred, how many lines were changed as a result of the commit, an identity of the committer, the files that were committed, or any combination thereof, but not the contents of the commit. Then, the centralized software development tool 352 may generally identify any outcomes (e.g., consequences or changes) occur as a result of the commit.

The data activity data 362 and/or historical data 360 received by the centralized software development tool 352 may reside in a table in a database. As discussed above, in some embodiments, the activity data 362 and/or historical data 360 may be normalized to a neutral format for each process tool type. Further, the normalized data may be tagged with an indication of the type of software development tool 354 where the data originated from, such that a user may retrieve specifics of the activity data 362 and/or historical data 360, if necessary. For example, a first story imported from a first software development tool 354 and a second story imported from a second software development tool 354 may be stored together in a table of a database. When a user drills into the first story via the centralized software development tool, the user may be navigated to an instance associated with the first software development tool 354. Similarly, when a user drills into the second story via the centralized software development tool 352, the user may be navigated to an instance associated with the second software development tool 354. It should be noted that the data, such as a story, for a particular software development tool 354 may be stored during the lifespan of an application (e.g., software file) being developed.

Figure 7:
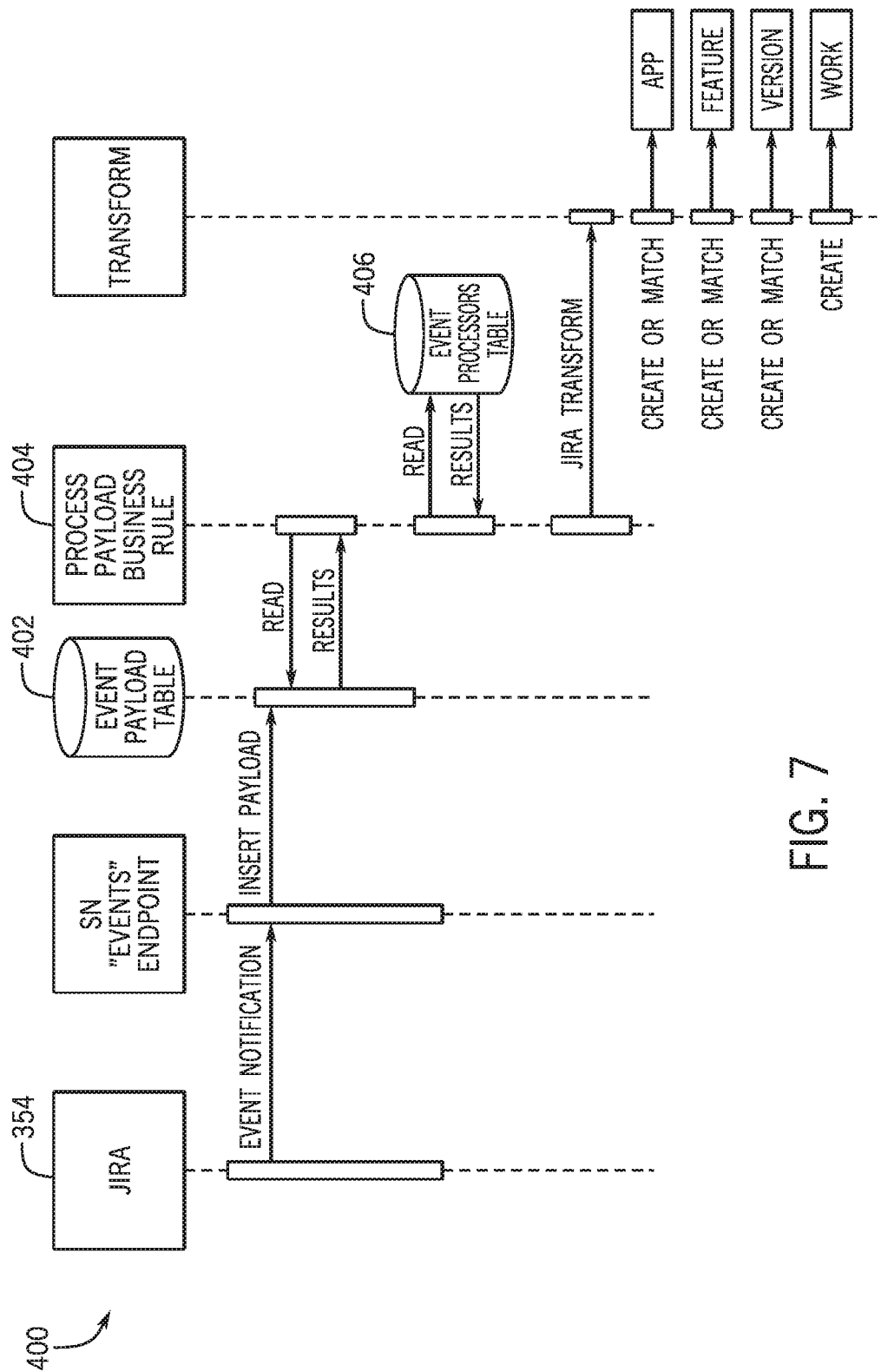
FIG. 7 shows a flow diagram of an example process for payload processing, in accordance with aspects of the present disclosure.

As discussed herein, in some embodiments, an event notifications may not be handled immediately. In such embodiments, a request payload may be validated and diverted to a staging table for later processing (e.g., payload processing). FIG. 7 shows an example of a flow diagram relating to a process 400 for payload processing. Certain software development activities (e.g., indicated by the arrows 410) may occur between the event payload 502 and the process pay load 504, and the event processors table 506.

In general, handling an event notification payload may involve identifying the source of the data (e.g. JENKINS vs TEAMCITY), and converting the data from the native tool's format to a neutral format (e.g. JENKINS declares job execution time as "elapsedTime", but TEAMCITY declares it as "duration"). JENKINS is available via the Jenkins project headed by the Software in the Public Interest (SPI), a non-profit 501 (c) (3) organization, of New York, U.S.A. TEAMCITY is a trademark of JetBrains s.r.o.

To identify the data source, each tool may pass a unique identifier with every event notification. The identifier may be used to prompt a suitable transformation or normalization of the data if needed. By having the unique tool instance, this may enable a user to discriminate data coming from two tools of the same type where the data's native ID is not sufficiently unique.

Referring to the illustrated process 400, requests may be sent to a single "event" REST endpoint exposed for multiple tool types. The endpoint handler stores the payload and tool type in the Event Payload table 402 along with the tool type identified by the unique ID. In some embodiments, storing the payload and/or the tool type in the event payload table 402 triggers an asynchronous business rule called Process Payload 404 which executes an appropriate transformation script from the Event Processors table 406. The payload is transformed, stored in a tool-specific table, and the payload record state becomes "Processed". Processed payloads may be auto-flushed from the table on a schedule.

In some embodiments, if no processor is registered for the tool, the state is set to "Unmatched", and "Processed". This may happen if a webhook is configured incorrectly through a manual setup process. It may also happen if event notifications are sent to the tool from a tool that has not been configured within Enterprise DevOps. As such, unidentified payloads may be exposed to administrators for troubleshooting purposes.

In some embodiments, a user may wish to add new tool types. An exemplary process for creating new tool types may include creating a table to store the tool-specific data, adding an event processor for the tool that may write to the new table, registering an instance of the tool (e.g., in a DevOps tools) table and classifying it as a newly-created tool type, and registering a webhook in a tool instance that sends the payload expected and may include the a tool ID.

Figure 8:
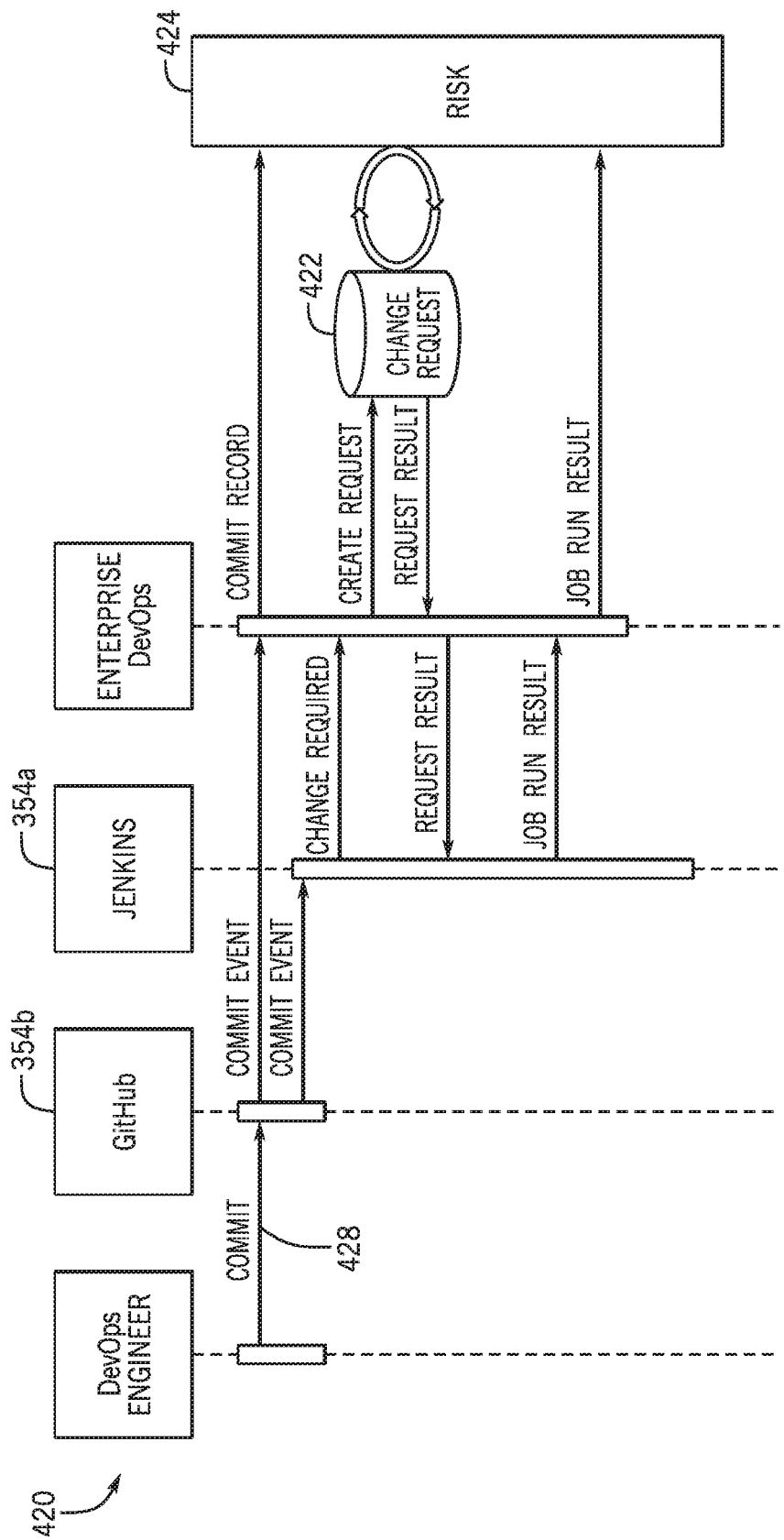
FIG. 8 shows a flow diagram of an example process for change management, in accordance with aspects of the present disclosure.

FIG. 8 is a flow diagram of a process 420 for change request management. As referred to herein, a "change request" is a request submitted in response to a change or modification made to a software file. For example, a change request may be submitted in response to a user making a commit, revert, and the like to software code or instructions. As shown in the illustrated embodiment, the illustrated process 402 includes a change request plug-in 422 coupled with a first software development tool 354a (e.g., JENKINS) and a second development tool 354b, such as software development tool that is storing software files 356. JENKINS is available via the Jenkins project headed by the Software in the Public Interest (SPI), a non-profit 501 (c) (3) organization, of New York, U.S.A. In general, the illustrated embodiment of the process 420 shows a change request plug-in 422 that analyzes input commit events and determines a request result based on a risk output (e.g., risk output 368) determined by the risk component 424.

In some embodiments, the present techniques may facilitate a plug-in with the first development tool 354a. The plug-in may enable fine-tuned control over job execution. In some embodiments, the plug-in may manage change requests and approvals using standard endpoints, and those endpoints could be used directly from any tool for the same result. The plug-in may store credentials using the standard Jenkins Credentials API, and provide configuration settings to specify the connection to a customer's cloud platform instance. Once the plug-in is installed and configured, an administrator can add change control to any existing or new job with minimal effort.

Figure 9:
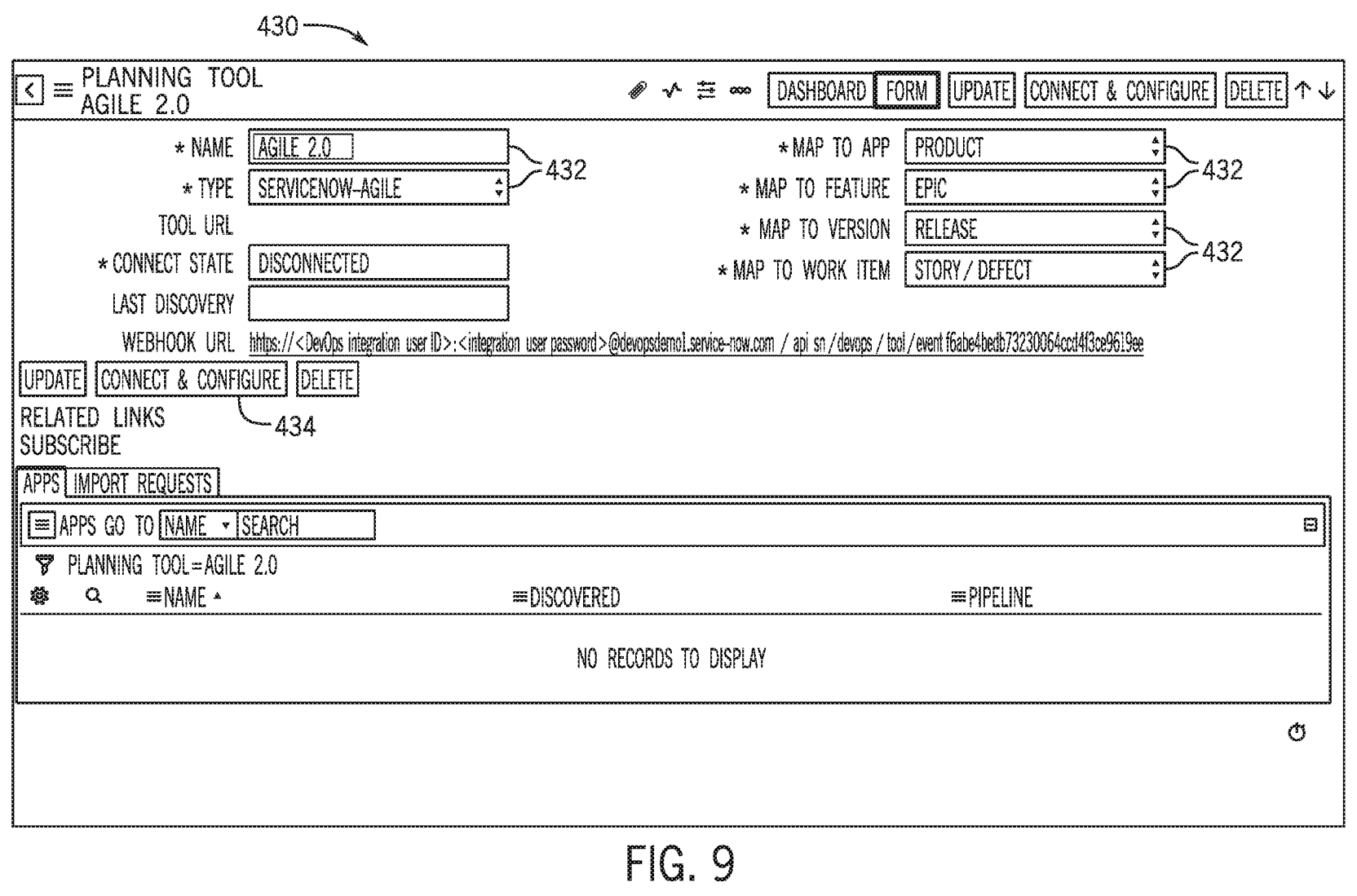
Figure 10:
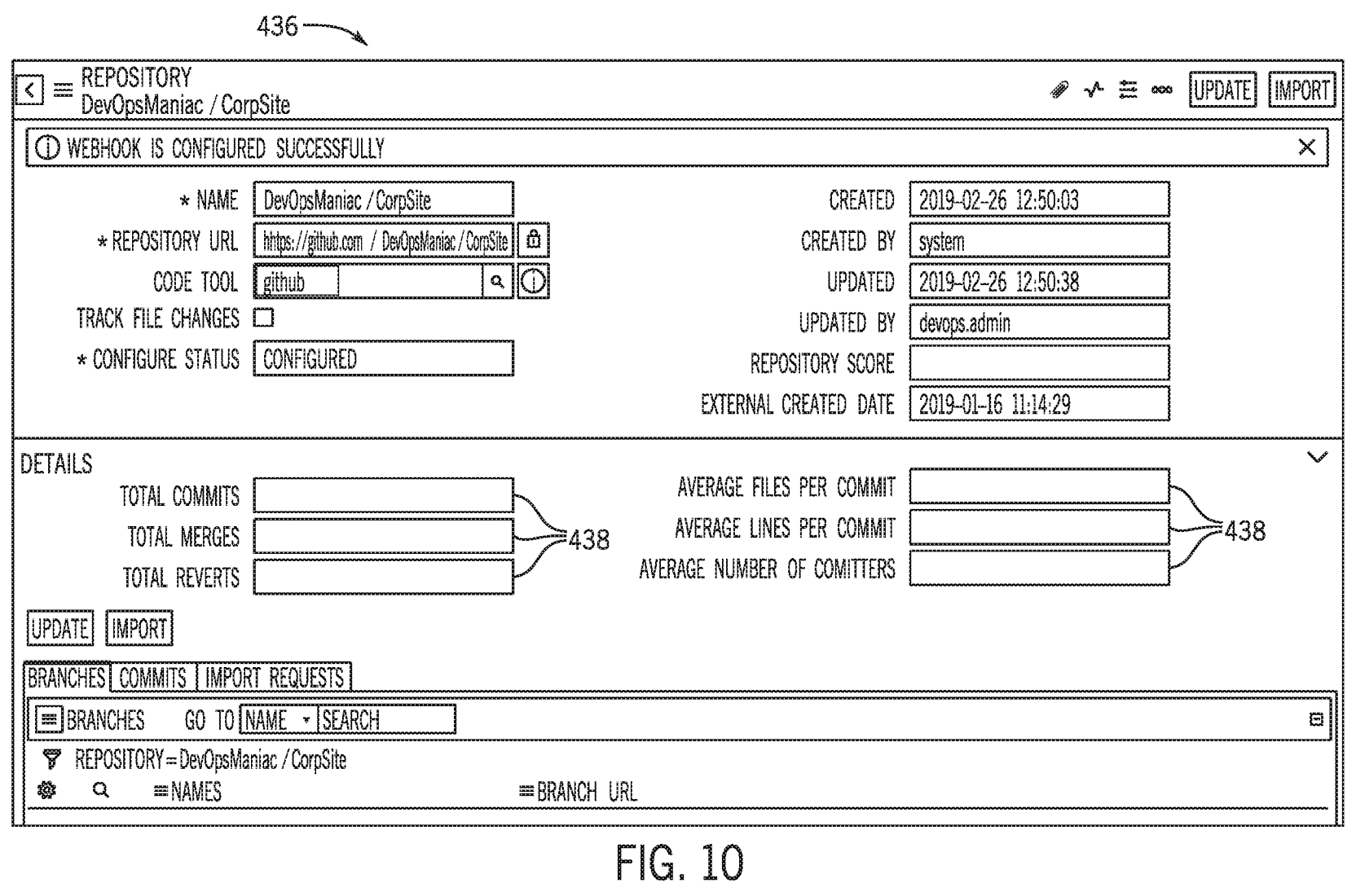
Figure 11:
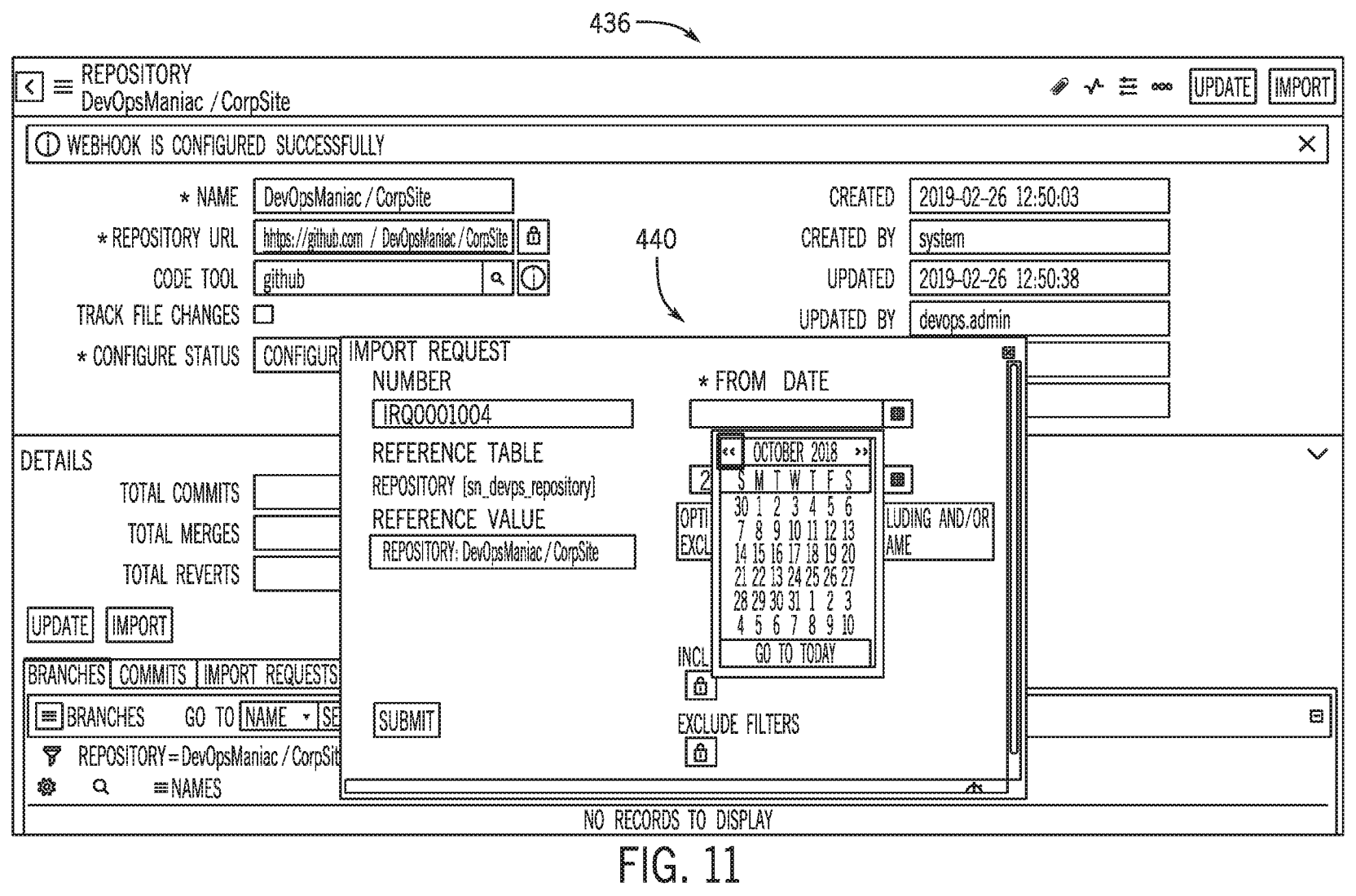
Figure 12:
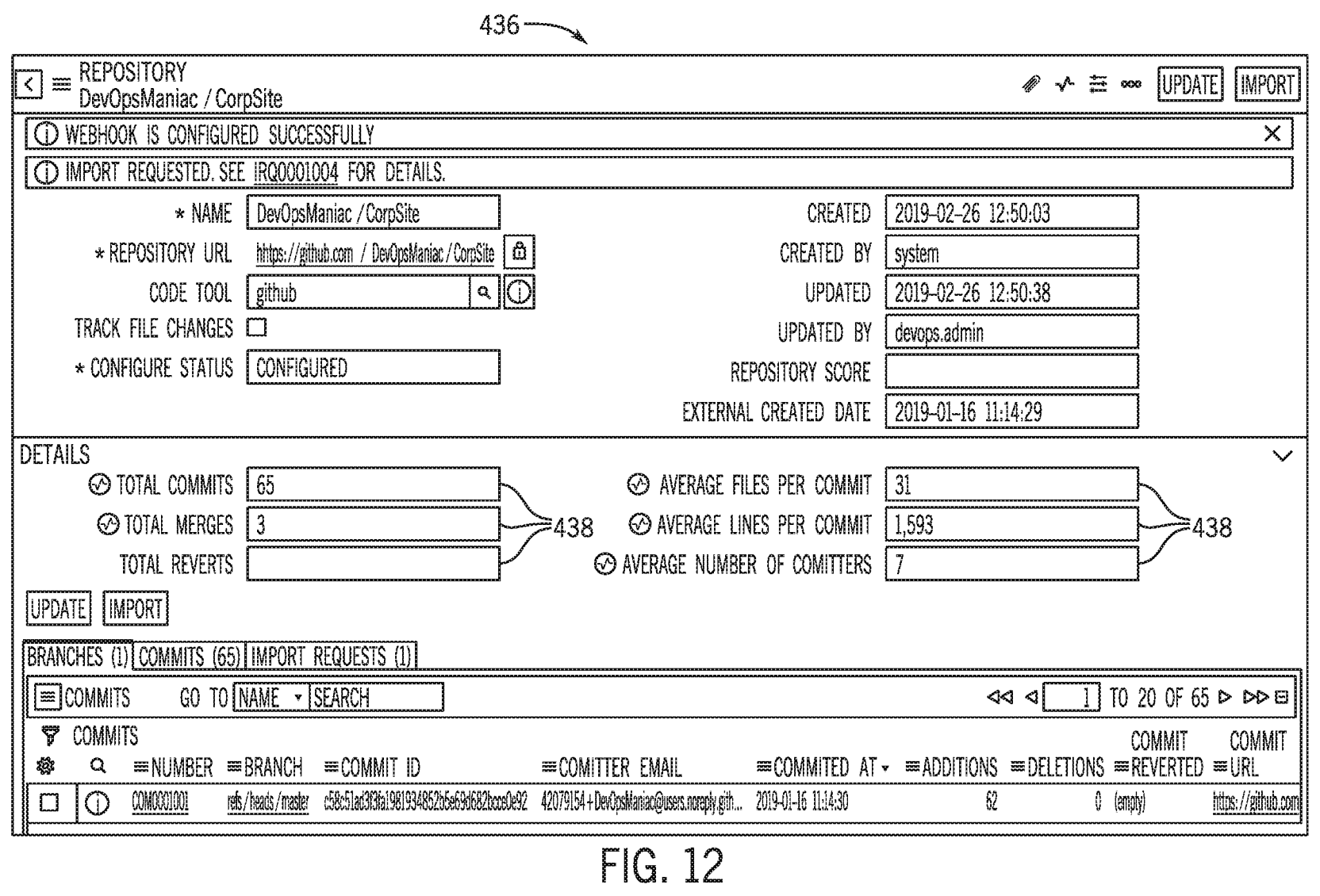

To further help illustrate the steps in the flow diagram 350 of FIG. 5, FIG. 9 illustrates a software development tool connection form 430 (as may be depicted on a graphical user interface) with fields that may be filled in by the processor 82, the user, or both to generate the development tool connection form 430. As shown, in the illustrated embodiment of FIG. 9, the software development tool connection form 430 includes fields 432 that the user may fill-in regarding the software development tool 354 to be connected to the centralized software development tool 352. In response to the user selecting the selectable feature 434, the software development tool connection form 430 may update to display the software development tool configuration form 436 as shown in FIG. 10. In general, the software development tool configuration form 436 displays information (e.g., in information fields 438) indicative of the connected software development tool 354 as well as activity data 362 that are relevant to the type of software development tool 354. In this example, this may be the first time the user has connected to the software development tool 354 associated with the software development tool configuration form 436 and, thus, the information fields 438 may be blank. In this case, the user may create an import request by selecting the selectable feature. For example, FIG. 11 shows an import request window 440 associated with the software development tool configuration form 436 that may enable a user to select a date range from which to import historical data 360. In response to submitting the import request via the import request window 440, the information fields of the software development tool configuration form 436 may be updated to show certain historical data 360, as shown in FIG. 12.

Figure 13:
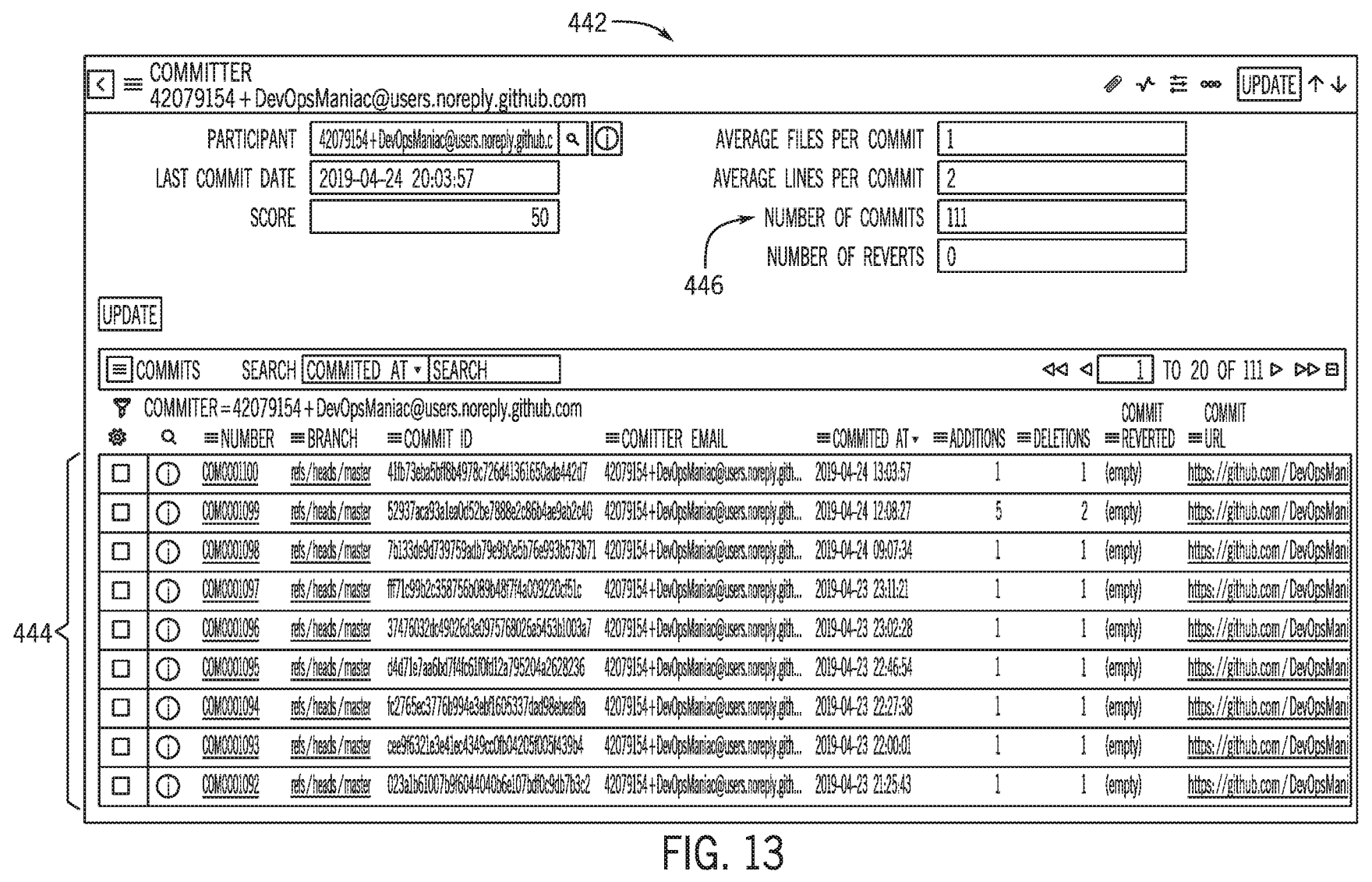

To further illustrate the techniques described herein, FIG. 13 shows a screenshot of a software development tool risk window 442 that a user may utilize to determine whether a risk output 368 should result in an approval or an alert (e.g., process block 374). As shown in the illustrated embodiment of FIG. 13, the software development risk window 442 displays data records 444 associated with obtained activity data 362 and/or historical data 360. For example, each record in the illustrated embodiment of FIG. 13 includes a committer ID, a date of the commit, a number of additions, a number of deletions, an indication of whether the commit was reverted, and a commit URL. The software development tool risk window 450 also includes summary data fields 446, such as an average files per commit, average lines per commit, a total number of commits, and a total number of reverts. Further, the development tool risk window 442 includes a field displaying the risk output 368, which is indicated as a numerical value. As generally described herein, the software development tool risk window 442 may be displayed to a user (e.g., a graphical user interface display) in response to any of the steps of process 350, such as process block 372 and/or process block 374.

Figure 14A:
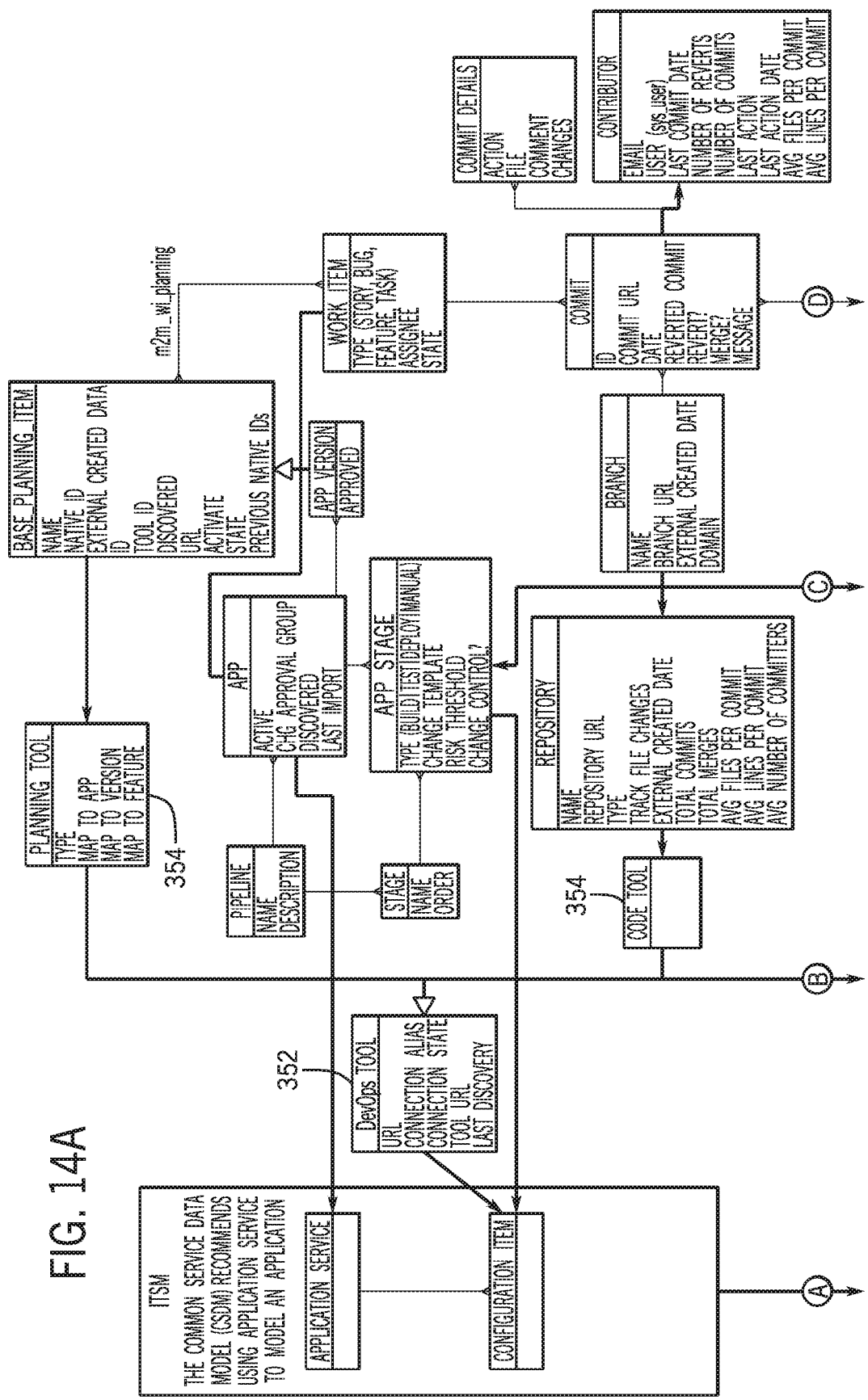
FIG. 14A is an example of a data model, in accordance with aspects of the present disclosure.
Figure 14B:
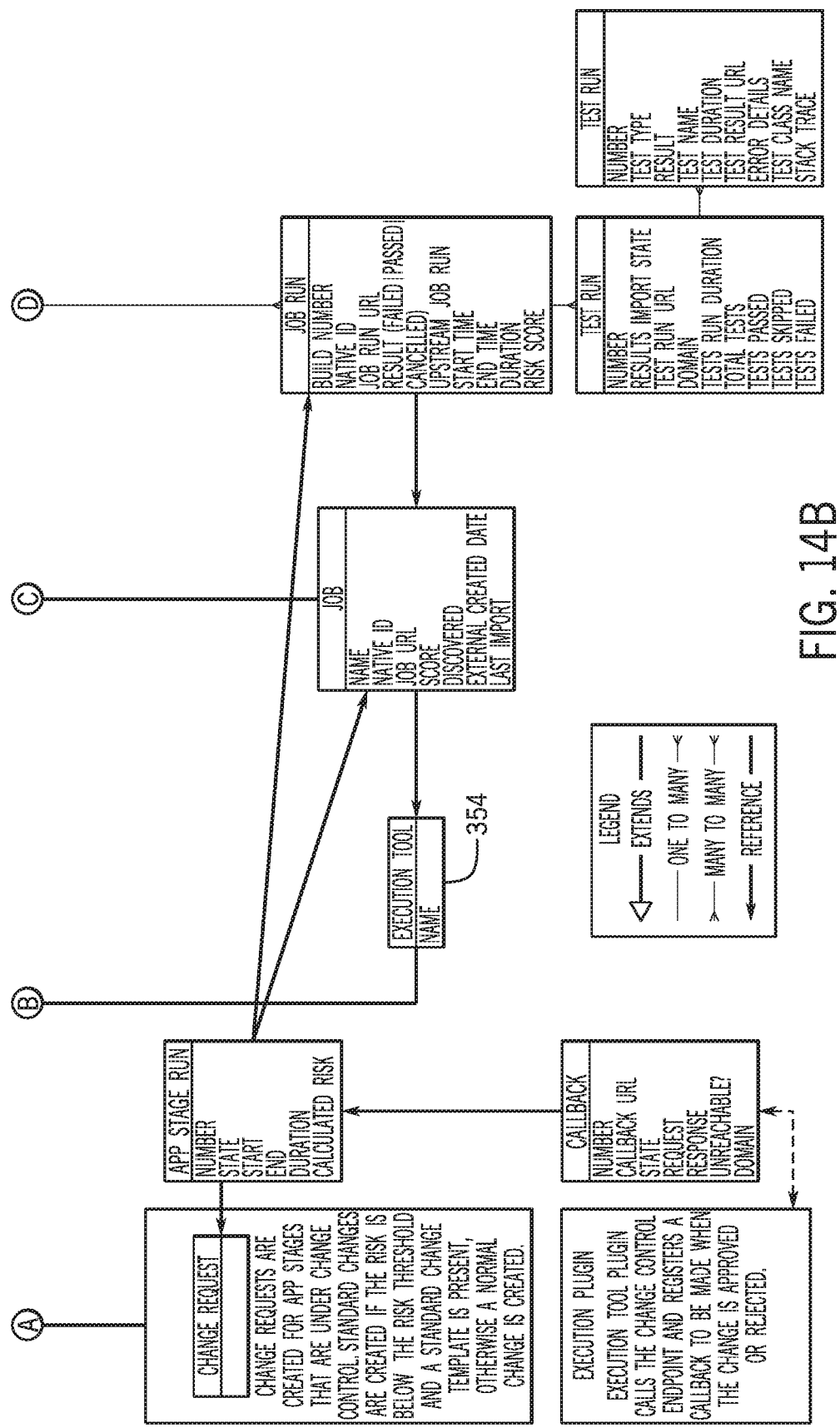
FIG. 14B is an example of a data model, in accordance with aspects of the present disclosure.

To further illustrate the techniques described herein, FIGS. 14A and 14B shows a block diagram 450 of a data model with example of the activity data 362 and historical data 360 that may be received by the centralized software development tool 352. As shown in the illustrated embodiment of FIGS. 14A and 14B, the centralized software development tool 352 may receive different types of data associated with commits, jobs, tests, an application stage, work items, and the like via one or more software development tools 354.

Accordingly, the present disclosure is directed to a centralized software development system that is capable of connecting to multiple software development tools and modifying software development activities. Further, as discussed herein, the centralized software development system modifies the software development activities based on activity data and/or historical data obtained from the multiple software development tools using a centralized software development tool to improve the efficiency of the software development process. More specifically, the disclosed centralized software development tool receives activity data and/or historical data, which are indicative of the occurrence software development activities such as changes, commits, runs, builds, test statuses, artifacts, and the like, rather than data that includes the specific content of the software development operations. In some embodiments, the obtained activity data and/or historical data is transformed into a neutral formation (e.g., non-specific to the software development tool where the activity data and/or historical data was received from) and stored in a table, such as for later processing.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   a processor; and
   a memory, accessible by the processor, the memory storing instructions that, when executed by the processor, cause the processor to perform operations action comprising:
   receiving activity data from one or more software development tools being executed by one or more client devices, wherein the activity data is indicative of version control activities executed on a software file by the one or more software development tools;
   identifying one or more types of the version control activities;
   determining a risk score associated with the software file based on the one or more types of the version control activities;
   modifying the risk score to generate a modified risk score based on a current stage of software development associated with the software file;
   comparing the modified risk score to a first threshold;
   in response to determining that the modified risk score does not exceed the first threshold, outputting an approval to a client device;
   in response to determining that the modified risk score exceeds the first threshold, comparing the modified risk score to a second threshold:
   in response to determining that the modified risk score exceeds the second threshold, outputting an alert to the client device; and
   in response to determining that the modified risk score does not exceed the second threshold, outputting an approval request to the client device.

2. The system of claim 1, wherein the version control activities comprises at least one of a build, a merge, a commit, a test run, a change, a revert, a deletion, or a branch.

3. The system of claim 1, comprising receiving historical data from the one or more software development tools, wherein the historical data comprises activity data and associated outcomes associated with a date range before the activity data was received; and wherein the risk score is determined based on the historical data.

4. The system of claim 1, wherein the approval is output via a third-party text-based communication application.

5. A method, comprising:
communicating with two or more software development tools;
receiving historical data from the two or more software development tools, wherein the historical data is indicative of a plurality of software development activities executed on a software file by the two or more software development tools and comprises outcomes associated with the plurality of software development activities;
identifying trends between the plurality of software development activities and the outcomes;
receiving activity data from the two or more software development tools, wherein the activity data comprises one or more occurrences of the software development activities;
identifying a risk score associated with a modified software file based on the trends and a number of the one or more occurrences of the software development activity;
modifying the identified risk score to generate a modified risk score based on a current stage of software development associated with the modified software file; and
determining the modified risk score exceeds a threshold;
in response to determining that the modified risk score exceeds the threshold, outputting a control signal to one or more client devices to cause the one or more client devices to halt operations using the modified software file.

6. The method of claim 5, further comprising converting the historical data, the activity data, or both, to transformed historical data or transformed activity data, or both, comprising a format that is non-specific to a type of the two or more software development tools.

7. The method of claim 6, wherein the transformed historical data, the transformed activity data, or both, are tagged with a developmental tool identification tag that indicates the software development tool from which the data originated.

8. The method of claim 7, further comprising storing the tagged transformed activity data, the tagged transformed historical data, or both, in one or more tables further storing additional activity data, additional historical data, or both from a same-type of software development tool.

9. The method of claim 5, wherein the historical data is received in response to connecting to the two or more software development tools.

10. The method of claim 5, wherein the received historical data is received in response to receiving a user input indicative a desired date range and wherein the historical data is associated with the desired date range.

11. The method of claim 5, comprising determining that a previous modification to the modified software file occurred outside of a date range; and modifying the output based on the determination.

12. The method of claim 5, wherein the activity data is received as part of a change request that is sent by the one or more software development tools in response to generating of the modified software file.

13. A tangible, non-transitory, machine-readable-medium, comprising machine-readable instructions that, when executed by a processor, cause the processor to perform acts comprising:

connecting to a plurality of software development tools;
receiving historical data from the plurality of software development tools, wherein the historical data is indicative of one or more software development activities executed on a software file by the plurality of software development tools and comprises outcomes associated with the one or more software development activities;
identifying trends in the historical data indicative of outcomes associated with occurrences of the one or more software development activities;
receiving activity data from the plurality of software development tools;
determining a risk score associated with the activity data based on the identified trends;
modifying the determined risk score to generate a modified risk score based on a current stage of software development associated with the software file;
comparing the modified risk score to a threshold; and
in response to determining that the modified risk score does not exceed the first threshold, outputting an approval to a client device;
in response to determining that the modified risk score exceeds the first threshold, comparing the modified risk score to a second threshold;
in response to determining that the modified risk score exceeds the second threshold, outputting an alert to the client device; and
in response to determining that the modified risk score does not exceed the second threshold, outputting an approval request to the client device.

14. The tangible, non-transitory, machine-readable-medium of claim 13, wherein the approval request comprises an indication of the modified risk score.

15. The tangible, non-transitory, machine-readable-medium of claim 13, wherein the approval request comprises one or more fields that summarize the activity data.

16. The system of claim 1, wherein outputting the alert comprises outputting a control signal to one or more client devices to cause the one or more client devices to halt operations using the software file.

17. The tangible, non-transitory, machine-readable-medium of claim 13, wherein outputting the alert comprises outputting a control signal to one or more client devices to cause the one or more client devices to halt operations using the software file.

18. The tangible, non-transitory, machine-readable-medium of claim 13, wherein the software development activities comprise at least one of a build, a merge, a commit, a test run, a change, a revert, a deletion, or a branch.

19. The system of claim 1, wherein determining the risk score comprises determining the risk score based on the one or more types of the version control activities and a number of occurrences of the one or more types of version control activities.

20. The system of claim 1, wherein modifying the risk score to generate the modified risk score based on the current stage of software development associated with the software file comprises modifying the risk score based on one or more previously completed stages of the software development.

* * * * *